(12) United States Patent
Schibsbye

(10) Patent No.: US 11,555,476 B2
(45) Date of Patent: Jan. 17, 2023

(54) WIND TURBINE BLADE ROOT ATTACHMENT SYSTEM AND METHOD OF MANUFACTURE

(71) Applicant: TPI Composites, Inc., Warren, RI (US)

(72) Inventor: Karsten Schibsbye, Fredericia (DK)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/398,230

(22) Filed: Aug. 10, 2021

(65) Prior Publication Data

US 2021/0388727 A1    Dec. 16, 2021

Related U.S. Application Data

(63) Continuation of application No. 16/577,222, filed on Sep. 20, 2019, now Pat. No. 11,098,594.
(Continued)

(51) Int. Cl.
*F03D 1/06* (2006.01)

(52) U.S. Cl.
CPC ........ *F03D 1/0658* (2013.01); *F05B 2250/70* (2013.01); *F05B 2280/1071* (2013.01);
(Continued)

(58) Field of Classification Search
CPC ........ F03D 1/065; F03D 1/0658; F03D 3/062; F05B 2230/60; F05D 2250/70; F05D 2300/43
See application file for complete search history.

(56) References Cited

U.S. PATENT DOCUMENTS 7,163,378 B2 * 1/2007 Kildegaard ........... F03D 1/0658
                                                     416/248
9,370,905 B2 * 6/2016 Moeller Larsen .... F03D 1/0658
(Continued)

FOREIGN PATENT DOCUMENTS

CN       1638948 A    7/2005
CN     106438195 A    2/2017
(Continued)

OTHER PUBLICATIONS

Extended European Search Report for EP Application No. 19863715.9 dated May 6, 2022.
(Continued)

*Primary Examiner* — Courtney D Heinle
*Assistant Examiner* — Danielle M. Christensen
(74) *Attorney, Agent, or Firm* — Stephen J. Kenny; Vincenzo DiMonaco; Foley Hoag LLP

(57) ABSTRACT

Devices, systems, and methods of manufacturing wind turbine root attachment are provided. In various embodiments, an assembly for wind turbine root attachments includes a bushing, a core, and a filler. The bushing includes a body having cutouts extending from the proximal end to the distal end on either side of the bushing and a core cutout at the distal end. The bushing further includes an ear disposed at the proximal end of the bushing and within the first cutout. The core includes two wedges where the thick end of each wedge abut one another. The thin end of the proximal wedge is disposed within the core cutout and the core includes cutouts extending from the proximal end to the distal end on either side of the core. The filler is disposed within the cutout on the side of the assembly having the ear.

20 Claims, 9 Drawing Sheets

Related U.S. Application Data

(60) Provisional application No. 62/734,546, filed on Sep. 21, 2018.

(52) U.S. Cl.
CPC ........... *F05B 2280/4003* (2013.01); *F05B 2280/6013* (2013.01); *F05D 2230/60* (2013.01); *F05D 2240/30* (2013.01); *F05D 2250/70* (2013.01); *F05D 2300/43* (2013.01)

(56) References Cited

U.S. PATENT DOCUMENTS

| | | | |
|---|---|---|---|
| 9,631,502 | B2 | 4/2017 | Zeller et al. |
| 10,060,411 | B2 | 8/2018 | Caruso et al. |
| 2009/0324420 | A1 | 12/2009 | Arocena De La Rua et al. |
| 2012/0315143 | A1 | 12/2012 | Grove-Nielsen |
| 2014/0030094 | A1 | 1/2014 | Dahl et al. |
| 2017/0045032 | A1 | 2/2017 | Jacobsen et al. |
| 2020/0095867 | A1 | 3/2020 | Schibsbye |

FOREIGN PATENT DOCUMENTS

| | | |
|---|---|---|
| CN | 106863842 A | 6/2017 |
| CN | 107076107 A | 8/2017 |
| CN | 107110110 A | 8/2017 |
| CN | 108016055 A | 5/2018 |
| CN | 108443081 A | 8/2018 |

OTHER PUBLICATIONS

International Search Report and Written Opinion for International Application No. PCT/US19/52149 dated Dec. 4, 2019.

* cited by examiner

300

302 providing a plurality of wind turbine blade assemblies 304 engaging a filler and an ear of a first assembly of the plurality of assemblies into a second cutout and a fourth cutout of a second assembly of the plurality of assemblies 306 forming the plurality of assemblies into a ring

FIG. 3

WIND TURBINE BLADE ROOT ATTACHMENT SYSTEM AND METHOD OF MANUFACTURE

CROSS REFERENCE TO RELATED APPLICATIONS

This application is a Continuation of and claims the benefit of priority under 25 USC 120 to U.S. application Ser. No. 16/577,222 filed Sep. 20, 2019, which claims the benefit of priority under 35 USC 119 to U.S. Provisional Application No. 62/734,546 filed Sep. 21, 2018, the entire contents of which are hereby incorporated by reference.

BACKGROUND

Embodiments of the present disclosure relate to devices, assemblies, systems, and methods of manufacturing wind turbine blade root attachments.

BRIEF SUMMARY

According to embodiments of the present disclosure, devices, systems, and methods of manufacturing wind turbine blade root attachments are provided. In various embodiments, an assembly includes a bushing, a core, and a filler. The bushing includes a body having a proximal end and a distal end, a first cutout extending from the proximal end to the distal end on a first side of the bushing, a second cutout extending from the proximal end to the distal end on a second side of the bushing and a core cutout at the distal end, and an ear disposed at the proximal end of the bushing and within the first cutout. The core has a proximal end and a distal end and includes a first wedge and a second wedge distal to the first wedge. Each wedge has a thick end and a thin end, and the thick end of the first wedge abuts the thick end of the second wedge. The thin end of the first wedge is disposed within the core cutout and the core includes a third cutout extending from the proximal end to the distal end on a first side of the core and a fourth cutout extending from the proximal end to the distal end on a second side of the core. The filler is disposed within the first cutout and the third cutout and contacts the ear.

In various embodiments, a system for wind turbine blade root attachment includes a plurality of sub-assemblies arranged in a ring. The sub-assemblies each include a bushing, a core, and a filler, as described above.

In various embodiments, a method of forming a wind turbine root attachment system according to embodiments of the present disclosure includes providing a plurality of sub-assemblies, where each of the sub-assemblies includes a bushing, a core, and a filler, as described above. The plurality of assemblies is formed into a ring.

BRIEF DESCRIPTION OF THE SEVERAL VIEWS OF THE DRAWINGS

FIG. 3 illustrates a method of wind turbine blade root attachment according to embodiments of the present disclosure.

DETAILED DESCRIPTION

Modern wind turbine rotor blades are built from fiber-reinforced plastics as fiber-reinforced plastics have high strength-to-weight ratios. A rotor blade typically includes an airfoil shape having a rounded leading edge and a sharp trailing edge and the blade includes a blade root that connects to a hub of the turbine. Multiple rotor blades are connected at the respective blade root to the hub to create the wind turbine. The blade root includes a plurality of root bushings set within the fiber-reinforced polymer that provides reinforcement to the blade. Bolts are engaged with threads in the root bushings to connect the blade root to the hub.

In a wind turbine, the attachment of the root section of the rotor blades to the hub of a wind turbine is a critical joint where stresses tend to concentrate from external forces on the blade, such as gravity and wind. Thus, the root section of the blade must be stable enough to transfer forces from the wind turbine blade into the hub to thereby rotate the hub and generate electrical energy. As an interface to the hub, metal parts may be used which are inserted or attached in other ways to the very end of the root section. For instance, U.S. Pat. No. 4,915,590 (the entire contents of which are hereby incorporated by reference) discloses use of so-called sucker rods which are placed inside of the main body of a rotor blade and into which bolts can be screwed which connect an interface section of the hub with the rotor blade itself. The sucker rods can be glued into the main body, for example, and also include threads inside to receive the bolts coming from the hub.

Conical cylinders may also be used with threaded holes for a root attachment system. The rotor blade is then adhered to the conical cylinder either by gluing or by placing a curing laminate directly in contact with the metal root. The conical cylinder may for instance be fabricated of aluminum.

Figure 4:
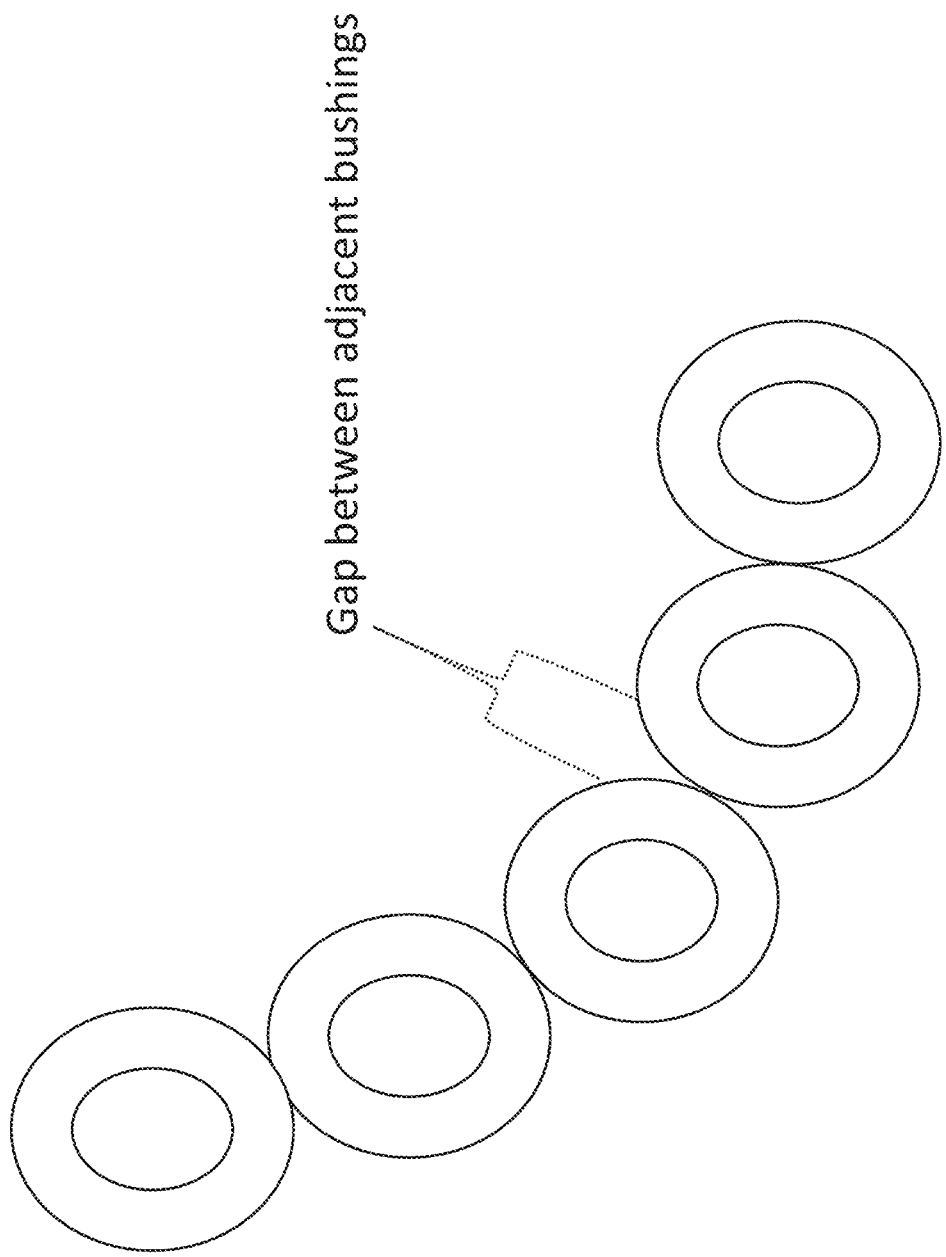
FIG. 4 illustrates a portion of an axial view of root bushing, depicting the gap present between adjacent circular root bushings.

Some root attachment systems utilize multiple hollow cylinders as bushings disposed around a ring attachment. Other root attachment systems may use square bushings. One or more layups of fiber reinforced polymer is applied over the ring of cylindrical (or square) bushings. Because of the shape of the cylindrical (or square) bushings, when the bushings are positioned around a ring, space or gaps are formed between each of the individual bushings. This space between the bushings may difficult to fill when laying up a fiber reinforced material around the ring. Furthermore, any unfilled gaps can jeopardize the structural integrity and performance of the blade. FIG. 4, which shows a portion of an axial view of root bushing, depicts the gap present in such cylindrical (or square) root bushing designs.

Accordingly, a need exists for a blade root attachment system that geometrically fills all void space when multiple bushings are arranged together in a ring, thereby reducing the amount of material used and increasing strength properties of the blade.

In general, assemblies of the present disclosure include a bushing that is generally cuboid-shaped having a cylindrical cutout on a first side, a cylindrical cutout on a second, opposite side, and a wedge-shaped cutout at a distal end. In various embodiments, the cylindrical cutouts on either side have substantially equal radii. In various embodiments, the cylindrical cutouts may have different radii.

On one of the sides, the bushing includes a cylindrically-shaped ear extending circumferentially outwardly. The ear may be integral with the bushing or may be a separate component that is installed in the bushing, e.g., by adhesives or fixation devices (e.g., screws). In various embodiments, the ear may be integrally formed into the bushing by, e.g., machining the cutout. In various embodiments, the radius of the ear may be substantially equal to the radius of the cutout. In various embodiments, the radius of the ear may be different (larger or smaller) than the radius of the cutout. In various embodiments, the bushing may include a threaded aperture that is configured to receive a screw for connecting the bushing to a wind turbine rotor hub. The aperture may be aligned along a longitudinal axis of the bushing. In some embodiments the bushing can be formed from a casting processes, which provides flexibility in the component design and low cost manufacturability.

The assembly may include a core that is generally formed from a first, proximal wedge and a second, distal wedge. In various embodiments, the wedges may be the same or different sizes. In various embodiments, the core may be made of a polymer foam, e.g., polyurethane foam. In various embodiments, the thick ends of each wedge may abut one another. In various embodiments, the core may be manufactured as a single piece or as two separate pieces that are subsequently connected at the thick ends. In various embodiments, the thin end of the first wedge corresponds to the shape of the cutout of the bushing such that the first wedge matingly engages the bushing. In various embodiments, the first wedge of the core may include a first cutout on one side and a second cutout on the opposite side that are shaped as conical cutouts. In various embodiments, when the first wedge is inserted into the bushing, the cutout of the first wedge and the cutout of the bushing together form a cylindrical cutout. In various embodiments, similar to the first wedge, the second wedge may include a first cutout on one side and a second cutout on the opposite side that are shaped as conical cutouts.

In various embodiments, the assembly may include a filler having a proximal, cylindrical portion and a distal, conical portion. In various embodiments, the cylindrical portion of the filler may correspond to (and matingly engage with) the side cutouts of the bushing and first, proximal wedge. In various embodiments, the conical portion of the filler may correspond to (and matingly engage with) the side cutouts of the second, distal wedge. In various embodiments, the filler may be made of glass fiber-reinforced polymer or any other suitable fiber-reinforced polymer. In some embodiments the filler is made of dry glass (e.g. Unidirectional Glass) and is injected with the rest of the blade.

A system of the present disclosure generally includes a plurality of the root attachment assemblies described above positioned in a ring. In various embodiments, each of the assemblies includes a bushing, a core, and a filler as described above. In various embodiments, the filler of each assembly matingly engages the ear and cutouts of another assembly, thus filling the void space between the two adjacent assemblies.

In various embodiments, the bushing, core, and/or filling may be made out of any suitable metal as is known in the art. In various embodiments, the bushing, core, and/or filling may include a metal, such as, for example, aluminum, steel, stainless steel, titanium, tantalum, tungsten, or any suitable combination of metals (e.g., a metal alloy). In various embodiments, the bushing, core, and/or filling may include a polymer, for example, polyethylene, polyurethane, polyethylene terephthalate, polyvinyl chloride, etc. In various embodiments, the bushing, core, and/or filling may be made by machining (e.g., CNC machining), 3D printing (e.g., using Direct Metal Laser Sintering (DMLS) and Fused Deposition Modeling (FDM)), open molding, closed molding, resin infusion, compression molding, composite hand layup, injection molding, pultrusion, automated fiber placement, tube rolling, automated tape laying, filament winding, resin transfer molding, or any suitable manufacturing technique as is known in the art. One skilled in the art will recognize that any suitable 3D printing technique may be used to manufacture the components described herein.

In various embodiments, the ring may be formed into a blade root of a wind turbine propeller blade. In various embodiments, the ring may be formed by composite layup.

Figure 1:
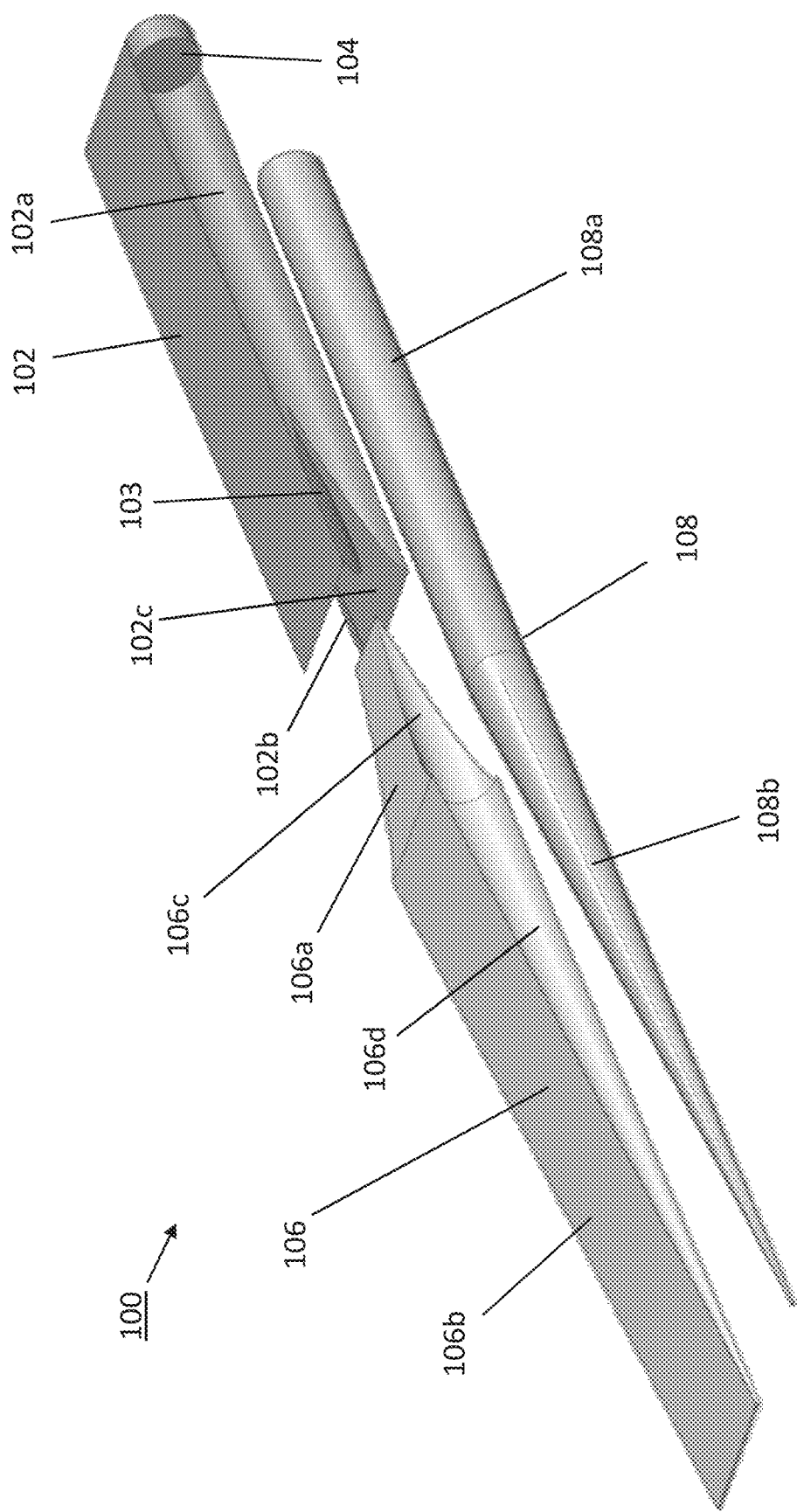
FIG. 1 illustrates an exemplary assembly, shown in an exploded view, for wind turbine blade root attachment according to embodiments of the present disclosure.

FIG. 1 illustrates an exemplary assembly 100 for wind turbine blade root attachment according to embodiments of the present disclosure. The assembly 100 includes a bushing 102 that is generally cuboid-shaped having a cylindrical cutout 102a on a first side, a cylindrical cutout 102b on a second, opposite side of the bushing 102, and a wedge-shaped cutout 102c at a distal end of the bushing 102. The wedge shaped cutout 102c extends from the distal end to the proximal end of the bushing 102 a distance sufficient to receive wedge 106a (as described in further detail below). In the exemplary embodiment shown, the cutout 102c extends approximately 25% of the length of the bushing 102. In the exemplary embodiment shown, the cutout 102c is wedge shaped, however alternative shaped cutouts can be employed. For example, the cutout 102c can be formed with an asymmetrical taper, or with interlocking features such as a tongue-groove mating relationship with portion 106a (which exhibits a complimentary shape).

In the exemplary embodiment shown, the cylindrical cutouts 102a, 102b have substantially equal radii, though differing radii can be employed as desired. On one of the sides, the bushing 102 includes a cylindrically-shaped protrusion or ear 104 extending outwardly. The ear 104 can be a disc having a thickness range, and in some embodiments include surface features (e.g. protrusions, etc.) for engaging the proximal end of filler 108 while still permitting relative rotation between the filler 108 and bushing 102. In various embodiments, the ear 104 may be integrally formed into the bushing 102 by, e.g., machining the cutout 102a. In some embodiments, the ear 104 can be a separate component, e.g. casted, that is removably attached to the bushing to allow removal/replacement of damaged fillers 108. The radius of the ear 104 is substantially equal to the radius of the cutout 102a. The bushing 102 further includes a threaded aperture 103 that is configured to receive a screw for connecting the bushing 102 to a wind turbine rotor hub. As shown in the exemplary embodiment, the aperture 103 can have a tapered opening extending along the surface of wedge 102c. In the exemplary embodiment shown, the angle of the bushing is less than 20 degrees, e.g. approximately 7-8 degrees. The bushing 102 is made of a metal, such as, for example, steel.

The assembly 100 further includes a core 106 that is generally formed as a first wedge 106a and a second wedge 106b. The core can be made of polyurethane foam. In some embodiments the core is constructed as a single integral component, alternatively, the core can be formed as a multi-piece component (e.g. wedge 106a can be separate from wedge 106b and joined at their respective apices). The thick ends of each wedge 106a, 106b abut one another. The thin end of the first wedge 106a corresponds to the shape of the cutout 102c of the bushing 102 such that the first wedge matingly engages the bushing. The bushings 102 can be reused in the event a core 106 is damaged. The first wedge 106a of the core 106 includes a first cutout 106c on one side and a second cutout (not shown) on the opposite side that are shaped as conical cutouts. When the first wedge 106a is inserted into the bushing 102, the cutout 106c and the cutout 102a together form a cylindrical cutout with both cutouts 106a, 102c sharing a common longitudinal axis. The second wedge 106b includes a first cutout 106d on one side and a second cutout (not shown) on the opposite side that are shaped as conical cutouts. In some embodiments the core is equally tapered on the top and bottom surfaces. Additionally, or alternatively, the core can be tapered such that it lies flat against the mold surface and exhibits a complementary/mirror contour to the mold surface. In the exemplary embodiment shown, the core has a uniform taper for each root-insert subassembly, however varying amounts of taper can be employed. For example, the cores disposed on the root insert at locations coinciding with the high pressure side of the blade can have a lesser amount of taper than the cores disposed on the root insert at locations coinciding with the lower pressure side of the blade.

Figure 5:
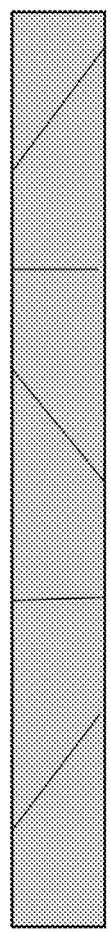
FIG. 5 illustrates a segment UD-fiber which can be cut according to the pattern shown to form a filler in accordance with the present disclosure.
Figure 6:
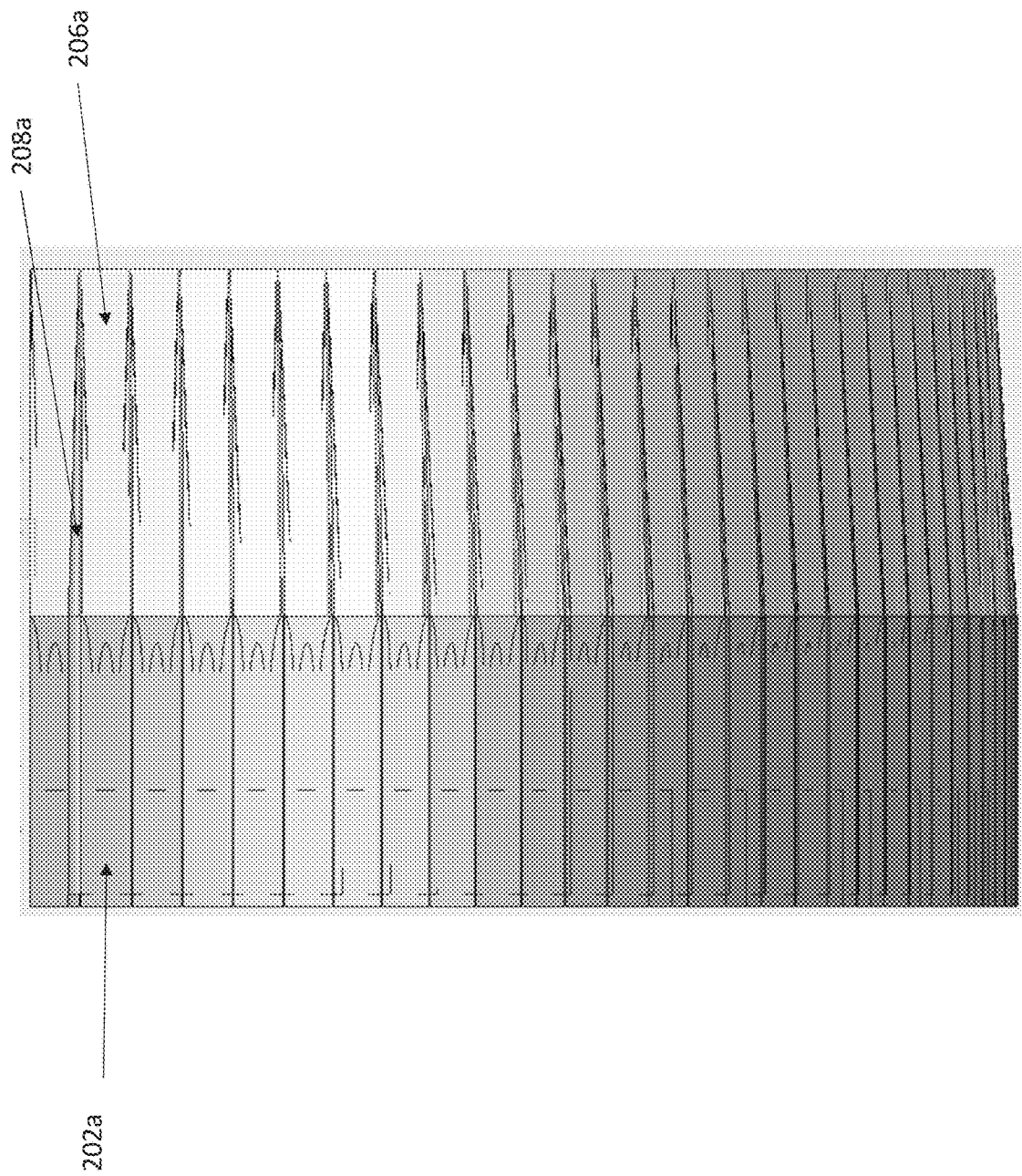
FIGS. 6-9 illustrates additional views of an exemplary embodiment of the root attachment in accordance with the present disclosure.
Figure 7:
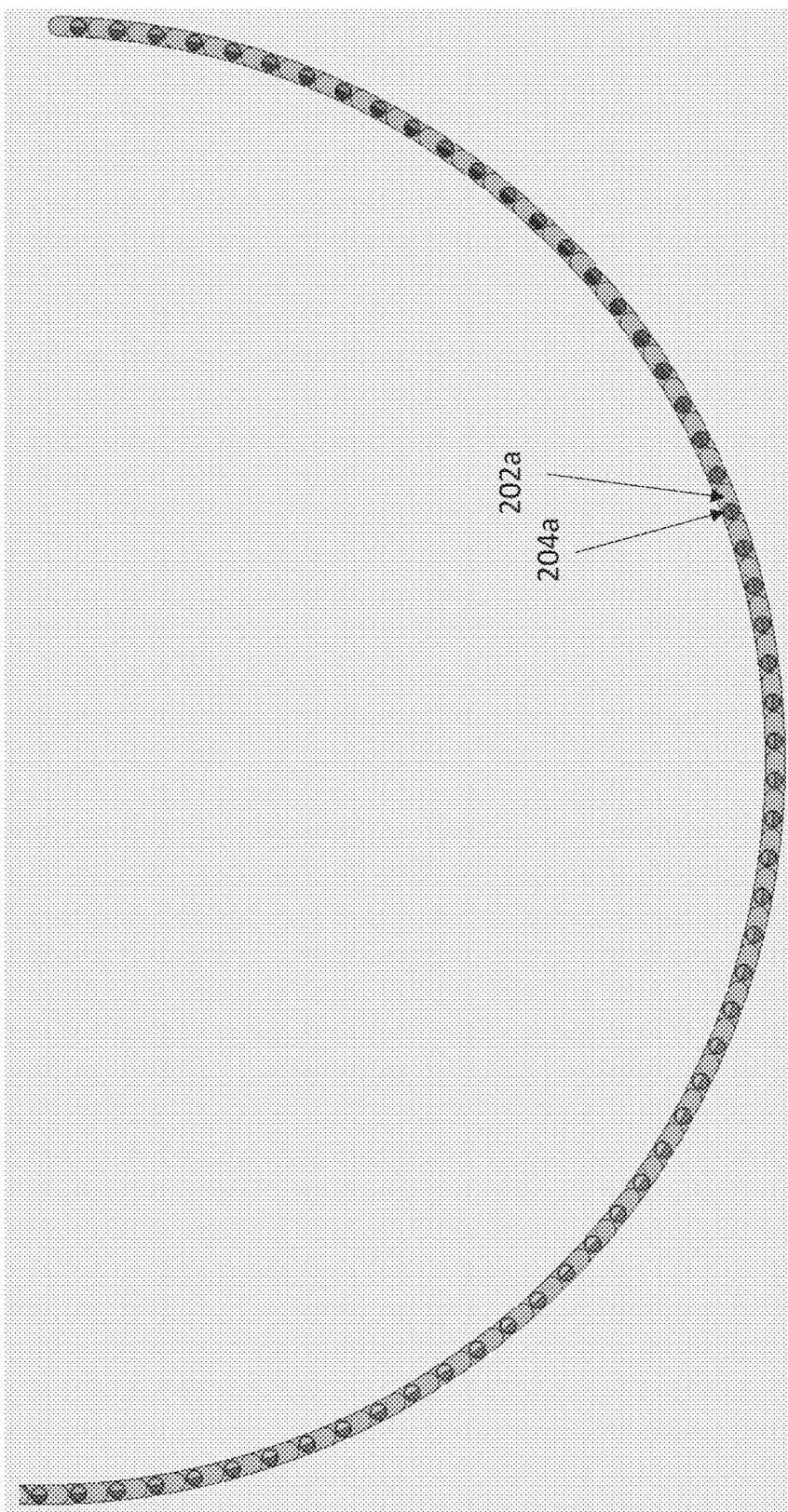
Figure 8:
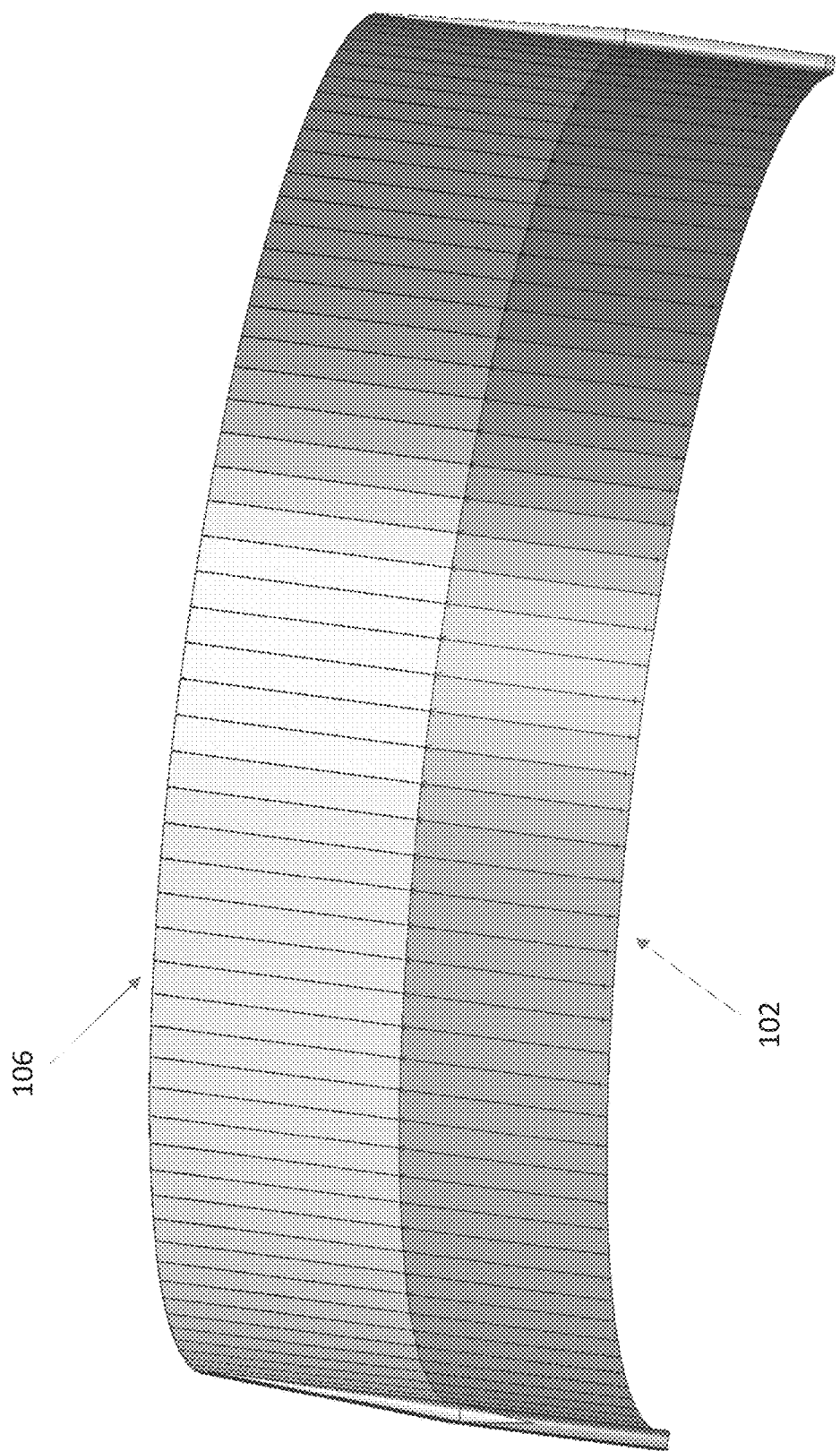
Figure 9:
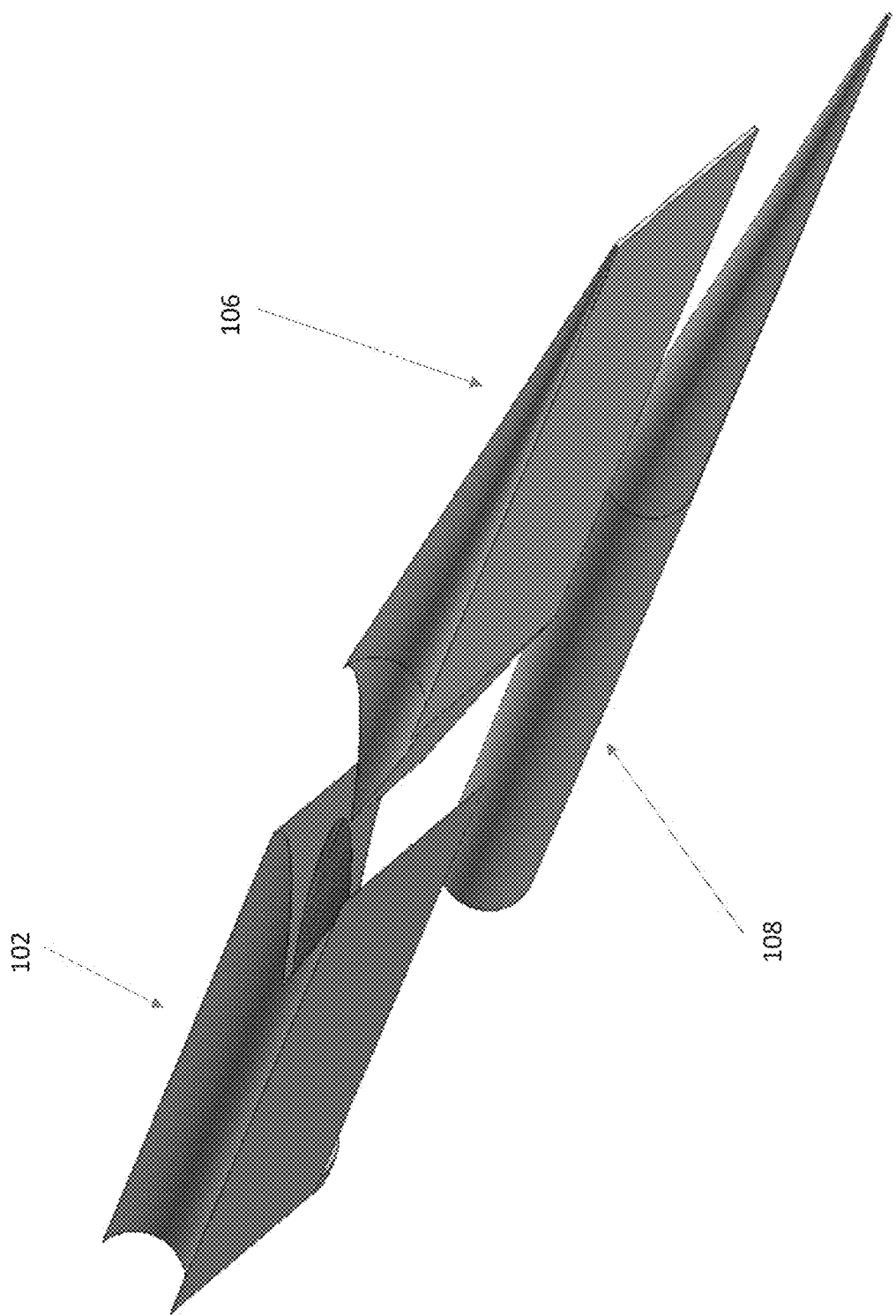

The assembly 100 further includes a filler 108 having a proximal, cylindrical portion 108a and a distal, conical portion 108b. The filler 108 is made of glass fiber-reinforced polymer. The filler 108 can be formed from residual or recycled unidirectional glass fiber left over from the production of the blade skin. For example, FIG. 5 depicts a segment of this fiber which can be cut according to the pattern shown which can then be shaped, e.g. rolled up, into the desired filler shape and size.

The bushing 102 and core 106 can be attached together as an initial sub-assembly which is then placed in mold and held in place by a root ring. Next, the filler 108 is laid down or inserted in place between adjacent sub-assemblies of 102/106. This process is repeated to form the complete ring. In some embodiments the busing 102, core 106 and filler 108 are bonded together with an adhesive applied across all abutting surfaces. Alternatively, the adhesive can be applied only at select locations. In some embodiments the components are held together by the frictional forces via an interference fit.

Figure 2:
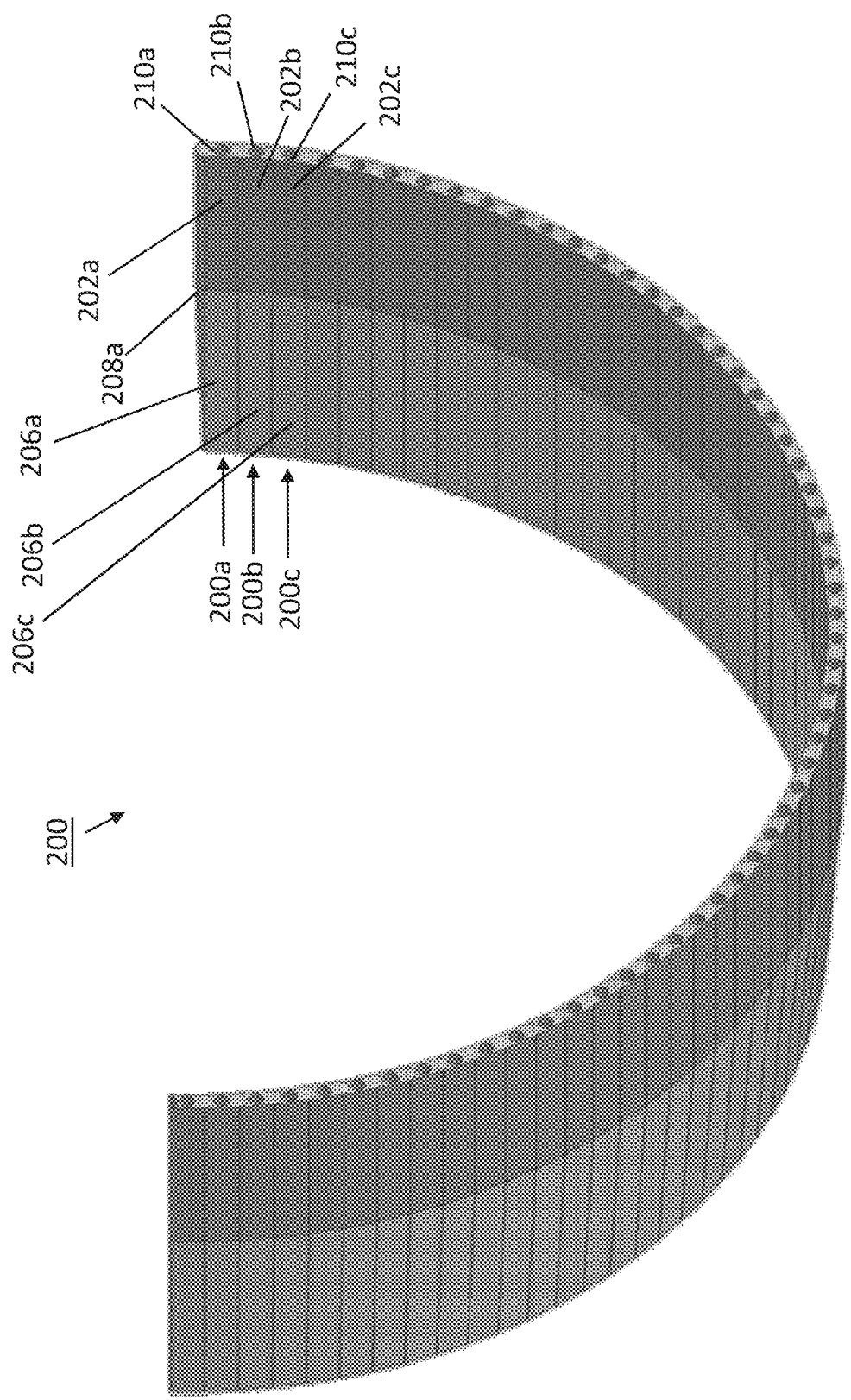
FIG. 2 illustrates a cross-section of an exemplary system for wind turbine blade root attachment according to embodiments of the present disclosure.

In accordance with an aspect of the disclosure, to form a root insert sub-assembly, a core 106 is inserted into bushing 102, with wedge 106a matingly received by cutout 102b. This effectively creates a unified part having non-arcuate (e.g. non-cylindrical, non curvilinear) shape. A plurality of these bushing-core units can be positioned adjacent to each other and formed into a ring, with fillers 108 inserted/disposed between adjacent bushing-core units such that no gaps are formed between adjacent bushing-core units. As shown in FIG. 2, the inner and outer circumferential surfaces of the subassemblies, when formed into a ring, exhibit a continuous surface having a constant inner and outer diameter.

For purpose of illustration and not limitation, the core, bushing and roller components disclosed herein can be formed to extend approximately one meter into the blade. However, alternative dimensions can be employed as desired to accommodate different blade designs and performance criteria. For instance, the thread can be M36, and the bushing 102 length can be approximately 0.5 meters; the core wedge can be approximately 0.8 meters with a total length of approximately 1.2 meters.

FIG. 2 illustrates a cross-section of an exemplary system 200 for wind turbine blade root attachment according to embodiments of the present disclosure. The system 200 generally includes a plurality of the root attachment assemblies described above with respect to FIG. 1 positioned in a ring shape. As shown in FIG. 2, the system 200 includes a plurality of root attachment assemblies, for example, a first assembly 200a, a second assembly 200b, a third assembly 200c, etc. In particular, the first assembly 200a includes a bushing 202a, a core 206a, and a filler 208a. The second assembly 202b similarly includes a bushing 202b, a core 206b, and a filler (not shown). The third assembly 202c similarly includes a bushing 202c, a core 206c, and a filler (not shown). The filler of the second assembly matingly engages the cutouts of the first assembly 202a and the second assembly and, with the ear of the second assembly 202b, fills the void space between the first assembly 202a and the second assembly 202b. In a similar fashion, the fillers for each of the adjacent assemblies around the ring fill the void space between the two assemblies. In some embodiments, adjacent assemblies (e.g. 200a, 200b) can be configured to permit relative movement therebetween over a first range of motion (e.g. from zero degrees, or coplanar, to 45 degrees with the horizontal plane of the adjacent assembly), and thereafter lock in place to prohibit further relative movement therebetween. This can simply manufacturing in that it allows a plurality of assemblies of respective bushings, wedges and fillers to be assembled on a flat surface, and thereafter bent or rotated to bring the ends of the assembly into engagement to form a ring structure. During manufacturing, the mold can receive approximately 10 layers of layup segments (e.g., glass fiber) and then the root attachment of the present disclosure is inserted, thereafter another approximately 10 layers of layup segments are applied on top of the root attachment. In some embodiments, a plurality of layers of root attachments can be employed, with varying layers of layup disposed therebetween.

FIG. 3 illustrates a method 300 of forming a wind turbine root attachment system according to embodiments of the present disclosure. At 302, a plurality of assemblies is provided. Each of the assemblies includes a bushing comprising a body having a proximal end and a distal end, a first cutout extending from the proximal end to the distal end on a first side of the bushing, a second cutout extending from the proximal end to the distal end on a second side of the bushing and a core cutout at the distal end, and an ear disposed at the proximal end of the bushing and within the first cutout. Each of the assemblies includes a core having a proximal end and a distal end, the core comprising a first wedge and a second wedge distal to the first wedge, each wedge having a thick end and a thin end, wherein the thick end of the first wedge abuts the thick end of the second wedge, the thin end of the first wedge disposed within the core cutout, the core comprising a third cutout extending from the proximal end to the distal end on a first side of the core and a fourth cutout extending from the proximal end to the distal end on a second side of the core. Each of the assemblies includes a filler disposed within the first filler cutout and the third filler cutout, the filler contacting the ear. At 304, the filler and the ear of a first assembly of the plurality of assemblies are engaged into the second cutout and the fourth cutout of a second assembly of the plurality of assemblies. At 306, the plurality of assemblies is formed into a ring.

In various embodiments, the ring may be formed into a blade root of a wind turbine propeller blade. In various embodiments, the ring may be formed by composite layup.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wind turbine blade root attachment assembly comprising:
   a bushing having a proximal end and a distal end,
      a first cutout on a first side of the bushing,
      a second cutout on a second side of the bushing, and
      a core cutout at the distal end;
   an ear disposed within the first cutout of the bushing;
   a core having a proximal end and a distal end, the core comprising
      a third cutout on a first side of the core,
      a fourth cutout on a second side of the core;
   wherein the proximal end of the core is disposed within the bushing with the first cutout of the bushing and the third cutout of the core having a common longitudinal axis; and
   a filler disposed within the first cutout and the third cutout, the filler contacting the ear.

2. The assembly of claim 1, wherein the joined bushing and core form a non-arcuate unified part.

3. The assembly of claim 1, wherein a plurality of joined bushings and cores are positioned adjacent each other and configured as a ring.

4. The assembly of claim 3, wherein a filler is disposed between adjacent joined bushing-core parts.

5. The assembly of claim 3, wherein the inner circumferential surface of the ring is a continuous surface having a constant inner diameter.

6. The assembly of claim 3, wherein the outer circumferential surface of the ring is a continuous surface having a constant outer diameter.

7. The assembly of claim 1, wherein the core is tapered with the distal end of the core configured to lie flat within a blade mold.

8. The assembly of claim 1, wherein the filler has a cylindrical portion at a proximal end and a conical portion at a distal end thereof.

9. The assembly of claim 1, wherein the core further comprises a wedge-shaped cutout at a distal end thereof.

10. The assembly of claim 1, wherein the first cutout of the bushing and the third cutout of the core are configured with an arcuate-shape.

11. The assembly of claim 1, wherein the proximal end of the filler is disposed within the first cutout of the bushing and the distal end of the filler is disposed within the third cutout of the core.

12. The assembly of claim 1, wherein the proximal end of the filler engages the ear.

13. The assembly of claim 1, wherein the ear has a radius of curvature equivalent to the radius of the first cutout of the bushing.

14. The assembly of claim 1, wherein the bushing, ear, core and filler are discrete components.

15. The assembly of claim 1, wherein the core comprises a first wedge and a second wedge distal to the first wedge, each wedge having a thick end and a thin end, wherein the thick end of the first wedge abuts the thick end of the second wedge.

16. A method of forming a wind turbine blade root attachment system, the method comprising:
   providing a plurality of assemblies, each assembly comprising:
      a bushing having:
         a body having a proximal end and a distal end,
         a first cutout on a first side of the bushing,
         a second cutout on a second side of the bushing, and
         a core cutout at the distal end,
      an ear, the ear disposed at the proximal end of the bushing and within the first cutout;
      a core, the core having:
         a proximal end and a distal end,
         a third cutout on a first side of the core,
         a fourth cutout on a second side of the core; and
      a filler, the filler disposed within the first bushing cutout and the third core cutout, and contacting the ear;
   engaging the filler and the ear of a first assembly of the plurality of assemblies into the second bushing cutout and the fourth core cutout of a second assembly of the plurality of assemblies; and
   forming the plurality of assemblies into a ring.

17. The method of claim 16, wherein the bushing and core are attached as an initial sub-assembly, with the filler inserted between adjacent bushing-core subassemblies.

18. The method of claim 16, further comprising applying adhesive between surfaces of the core, bushing, ear and filler.

19. The method of claim 16, wherein the plurality of subassemblies are assembled on a flat surface, and thereafter rotated to bring the ends of the assembly into engagement to form the ring.

20. The method of claim 16, further comprising positioning the distal end of the bushings within a wind turbine blade mold.

* * * * *